United States Patent
Lee

(12) United States Patent (10) Patent No.: US 7,275,320 B2
Lee (45) Date of Patent: Oct. 2, 2007

(54) TUBE CUTTER HAVING A RELATIVE MOVEMENT GENERATING PORTION

(76) Inventor: Tai-Hung Lee, No. 53, Lane 59, San-Ming 2nd Street, Dali City, Taichung Hsien (TW)

( * ) Notice: Subject to any disclaimer, the term of this patent is extended or adjusted under 35 U.S.C. 154(b) by 0 days.

(21) Appl. No.: 11/082,708

(22) Filed: Mar. 18, 2005

(65) Prior Publication Data
US 2006/0059692 A1 Mar. 23, 2006

(30) Foreign Application Priority Data
Sep. 21, 2004 (TW) .............................. 93128536 A

(51) Int. Cl.
*B23D 21/08* (2006.01)
(52) U.S. Cl. ................ 30/101; 30/95; 30/99
(58) Field of Classification Search ............... 30/101, 30/92, 93, 95, 96, 98–99, 102
See application file for complete search history.

(56) References Cited

U.S. PATENT DOCUMENTS 5,475,924 A * 12/1995 McDaniel ................. 30/102
5,943,778 A * 8/1999 Alana ........................ 30/101
6,237,449 B1 * 5/2001 Orlosky ..................... 30/101
6,739,055 B2 * 5/2004 Lee ............................ 30/98
6,810,587 B1 * 11/2004 Robertson .................. 30/96

* cited by examiner

*Primary Examiner*—Kenneth E. Peterson
*Assistant Examiner*—Sean Michalski
(74) *Attorney, Agent, or Firm*—Troxell Law Office, PLLC

(57) ABSTRACT

A tube cutter having a relative movement generating portion including a relative movement generating portion, a tube cutting base and a tube cutting slider. A manual input portion of the relative movement generating portion is to be held by a user's hand. A cutting blade, two auxiliary rollers and a feeding spring are disposed between the tube cutting base and the tube cutting slider. After the user applying a holding force, the pushing plate will compress the spring in the tube cutting slider so that the cutting blade feeds in. In case the applying force is too large, the entire tube cutting base and the cutting slider will be locked via the stopping plate. Thereby avoiding an over-applying force destroying the pipe to be cut. The tube can be automatically feed in or feed in by a holding force of a hand.

2 Claims, 6 Drawing Sheets

TUBE CUTTER HAVING A RELATIVE MOVEMENT GENERATING PORTION

BACKGROUND OF INVENTION

1. Field of the Invention

The present invention relates to a tube cutter and especially to a tube cutter having a relative movement generating portion. It can quickly clamp on a pipe. It can avoid over-applying force. It can automatically feed in and cut it. And, it utilizes the design of hand-clamping method for feeding the blade.

2. Description of the Prior Art

One typical traditional mini-tube cutter (such as the PCT Patent Pub. No. WO 02/02264) can be seen in FIG. 1. When a user wants to cut the pipe 91, the user must rotate a knob 83 with their fingers, so that the cutting blade 81 will move toward these two auxiliary rollers 82. Then, the pipe 91 can be clamped. The user still needs to rotate the knob 83 tighter to force the cutting blade 81 feed in. After which, the user can rotate this entire mini-tube cutter to cut the pipe 91. A resilient element 84 can also be included. However, rotating the knob 83 one rotation, only moves the cutting blade 81 a very small distance. If the diameter of pipe 91 is small, the user has to rotate the knob 83 multiple rotations (several rotations, more than ten rotations or even more), finally it will contact the pipe 91. So, its major disadvantage is that it cannot quickly clamp on the pipe 91 when the user prepares to cut it. In addition, when a non-professional user feeds in, it is quite possible to apply too much force on it so that the pipe 91 (especially a metal thin pipe) will be deformed or be destroyed. Once the pipe 91 is deformed, it becomes useless and cannot be used later.

Another traditional pipe cutter (such as British Patent Pub. No. GB 2309407) is illustrated in FIG. 2. When the user wants to cut a pipe or a tube, a resilient element 84 (or called energy-storing element) can create a pressing force so that the cutting blade 81 will feed in and then cut the pipe 91. However, if the size of the pipe to be cut is altered the user has to find another different-sized tube cutter to fin the corresponding size. Therefore it is troublesome to frequently change to different-size tube cutter every time. Thus from the above-mention two traditional tube cutters, it is known that the resilient element disposed with the cutting blade 81 or the auxiliary rollers 82 can achieve the function of automatic feeding.

The disadvantages of the above-mentioned devices can be summarized as follows:

[1] It cannot quickly clamp the pipe. One traditional method is to use fingers to rotate the knob 83. It is very slow and troublesome. The other traditional method is to select another different-sized tube cutter to fit a specific size. They cannot quickly clamp on the pipe.

[2] It is easy to damage the pipe by over-applying force. If the fingers rotate the knob 83, it makes the cutting blade 81 and the auxiliary rollers 82 to clamp on the pipe 91. Due to this kind of design, when a non-professional user operates it, it is very easy to apply too much force on it. So, this over-applying force will make the pipe 91 partially deform. Once the pipe 91 is deformed, it cannot return to its original shape (circular hollow pipe). Hence, the deformed pipe cannot be cut anymore and cannot be used again. Thus, due to such over-applying force, it is easy to damage the pipe by a non-professional user.

Furthermore, as shown in FIGS. 3 to 5, a conventional hand-held glue (such as silicon-glue) injector has a slight-tilted stopping device 72 disposed on a central rod 71. This stopping device 72 is a stopper 721 having a through hole 722. The central rod 71 passes through the through hole 722 of the stopper 721. A resilient member 73 presses against this stopper 721 and make it slightly tilted. It also keeps the stopper 721 at a position called locking position P1. At this moment, the edge of the through hole 722 contacts with the central rod 71 and limits the central rod 71. Actually, it only can move forward. And, it cannot move backward. However, if the user has pressed the stopper 721, this slightly tilted stopper 721 will move to another position called releasing position P2. Because its contacting friction decreases, the locking state is gone. The central rod 71 becomes a movable one without limitation. However, no one utilizes such simple one-way locking mechanism on a tradition tube cutter.

SUMMARY OF THE INVENTION

The primary object of the present invention is to provide a tube cutter having a relative movement generating portion. It can quickly clamp on a pipe.

The next object of the present invention is to provide a tube cutter having a relative movement generating portion. It can avoid over-applying force to make the pipe deform.

Another object of the present invention is to provide a tube cutter having a relative movement generating portion. It can automatically feed in and cut it. And, it utilizes the design of hand-clamping method for feeding the blade.

DETAILED DESCRIPTION OF THE PREFERRED EMBODIMENT

Figure 1:
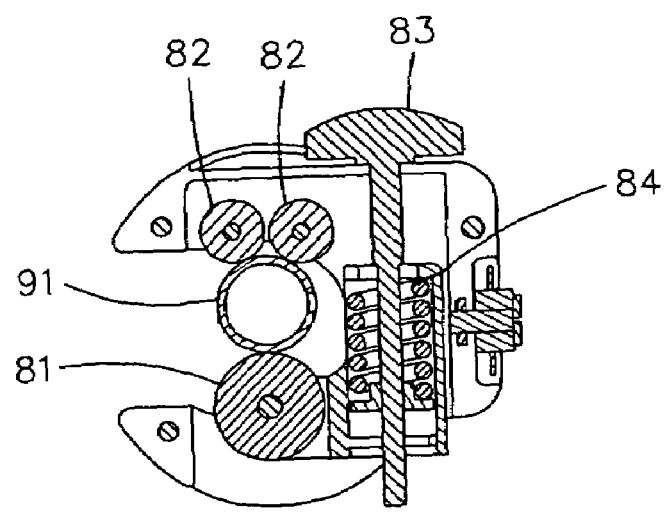
FIG. 1 shows a traditional mini-tube cutter.
Figure 2:
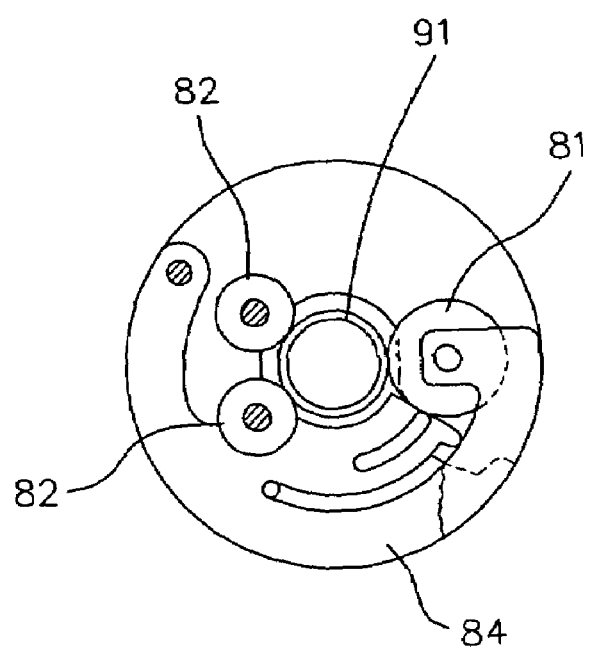
FIG. 2 illustrates another traditional pipe cutter.
Figure 3:
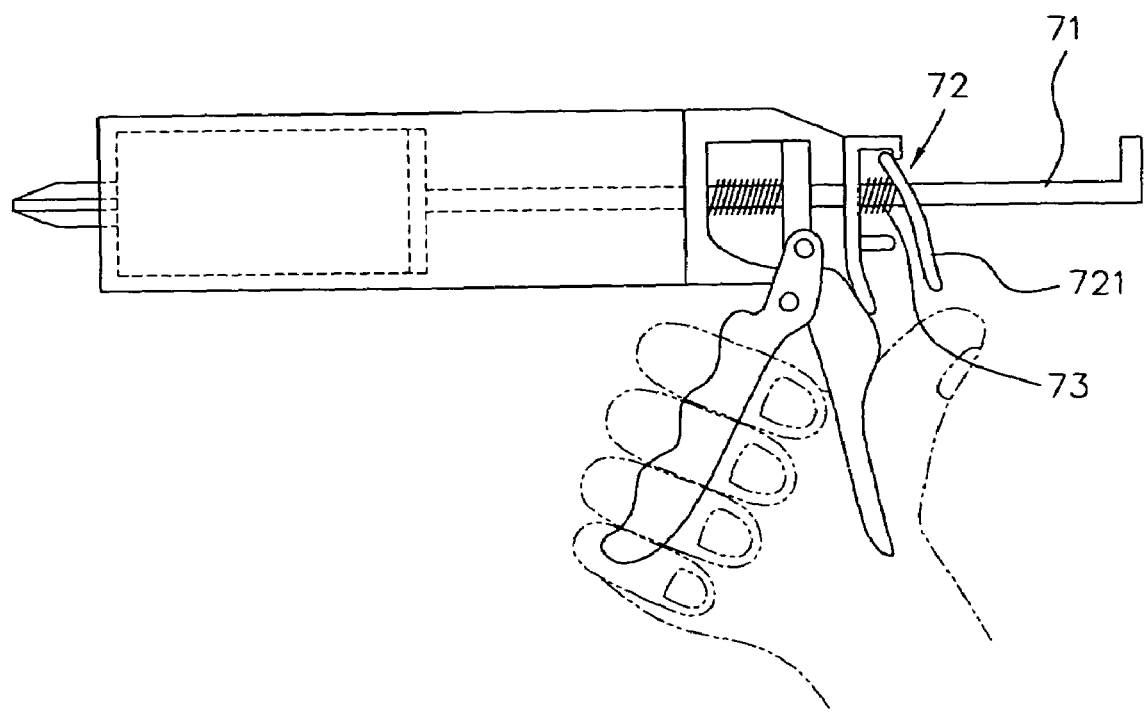
FIG. 3 is a front view of a conventional hand-held device.
Figure 4:
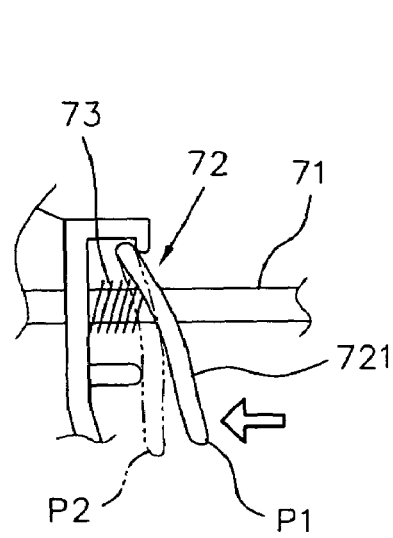
FIG. 4 shows the pressing action in a selected portion in FIG. 3.
Figure 5:
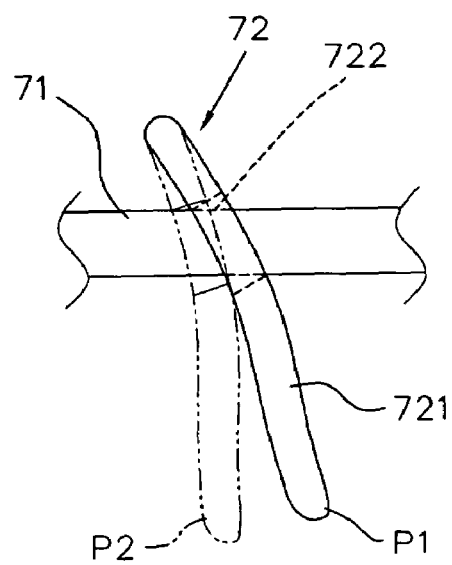
FIG. 5 is an enlarged view in a selected portion in FIG. 4.
Figure 6:
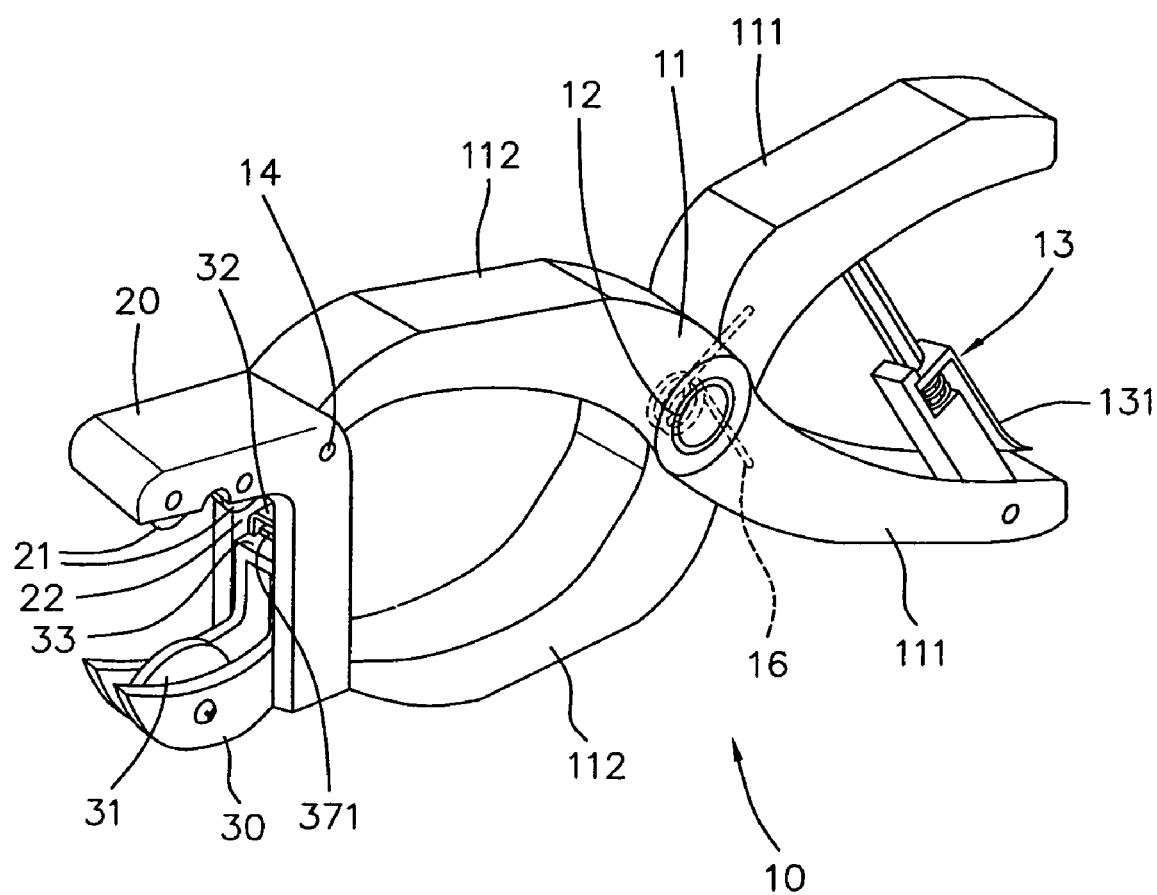
FIG. 6 is a perspective view of the present invention.
Figure 7:
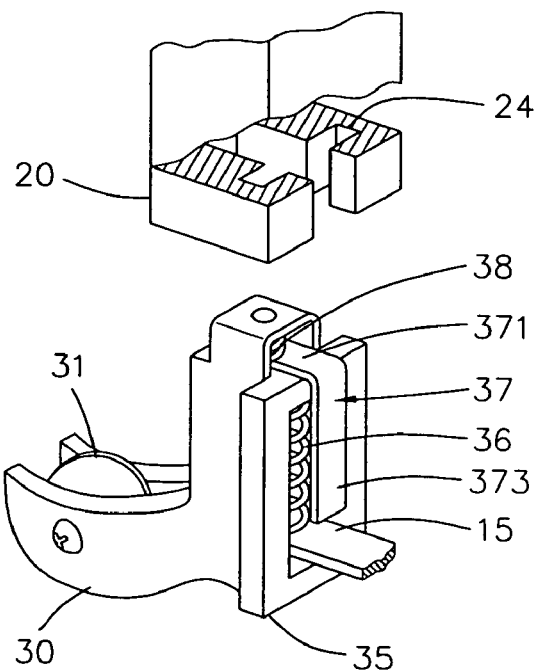
FIG. 7 shows the detailed structure of a portion of this invention.
Figure 8:
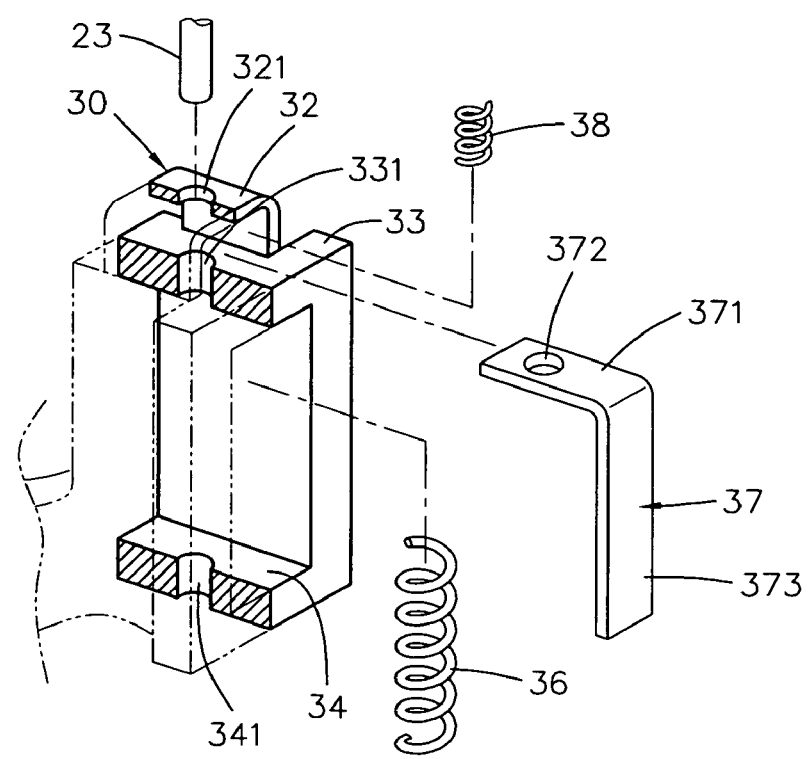
FIG. 8 shows the detailed structure of another portion of this invention.

Referring to FIGS. 6, 7 and 8, the present invention relates to a tube cutter having a relative movement generating portion. It mainly comprises a relative movement generating portion 10, a tube cutting base 20 and a tube cutting slider 30.

The relative movement generating portion 10 has a manual input portion 111, a pair of movement output portions 112, a one-way braking assembly 13, a connecting portion 14 and a pushing plate 15. This manual input portion 111 is provided for a user's hand to hold on.

One of the pair of movement output portions 112 is connected with the connecting portion 14 and the other one of the pair of movement output portions 112 is connected with the pushing plate 15, so that the pair of movement output portions 112 can selectively move the pushing plate 15 towards the connecting portion 14.

Furthermore, in this preferred embodiment, the manual input portion 111 and this pair of movement output portions 112 of the relative movement generating portion 10 are disposed on two ends of a pair of pliers 11. This pair of pliers 11 is pivoted by a central pivoting portion 12. And, a resilient element 16 is disposed on the central pivoting portion 12 for opening the manual input portion 111 when a one-way braking condition is removed. The one-way braking assembly 13 is disposed with a releasing element 131 for removing this one-way braking condition. However, such conventional one-way braking assembly 13 has been used in many existing devices. For example, it can be seen in a one-way braking mechanism of a hand-held glue (like silicon) injector. So, the detailed description of its structure is omitted here.

About the tube cutting base 20, it is disposed with a set of auxiliary rollers 21, a receiving space 22 and a pair of guiding slots 24. A locking rod 23, which passes through the pushing plate 15, may also be included.

Concerning this tube cutting slider 30, it usually has a cutting blade 31, a middle blocking portion 33, a lower blocking portion 34, a pair of sliding guiders 35, and a feeding spring 36, a stopping plate 37 and a stopping spring 38.

This cutting blade 31 is corresponding to the auxiliary rollers 21.

The upper blocking portion 32 has an upper hole 321.

The middle blocking portion 33 has a middle hole 331.

The lower blocking portion 34 includes a lower hole 341, an upper hole 321, a middle hole 331 and a lower hole 341. These holes allow the locking rod 23 to pass through.

The sliding guiders 35 are provided on opposing sides of tube cutting slide 30 for allowing the tube cutting slider 30 to slide on the guiding slots 24 of the tube cutting base 20.

With regard to the spring 36, it has two ends. One end presses against the middle blocking portion 33, and the other end presses against the pushing plate 15. Of course, the feeding spring 36 can be replaced by a resilient plate or other equivalent resilient force generating device.

The stopping plate 37 has a stopping section 371, a stopping hole 372 disposed on the stopping section 371, and a controlling section 373 extending toward the pushing plate 15. This stopping section 371 is adjacent to the middle blocking portion 33.

About the stopping spring 38, one end of the stopping spring 38 presses against the upper blocking portion 32 and the other end of the stopping spring 38 presses on the stopping section 371.

The structure of tube cutter having a relative movement generating portion is fully described above.

Of course, for the movement output portion 112, its shape can be modified or it can be modified into other equivalent structure.

The actual operation of this invention can be described as follows:

(1) Move the tube cutting base 20 to a pipe 91. That is, the pipe 91 is in the space between the auxiliary rollers 21 of the tube cutting base 20 and the cutting blade 31 of the tube cutting slider 30. But, there is no contact.

Figure 9:
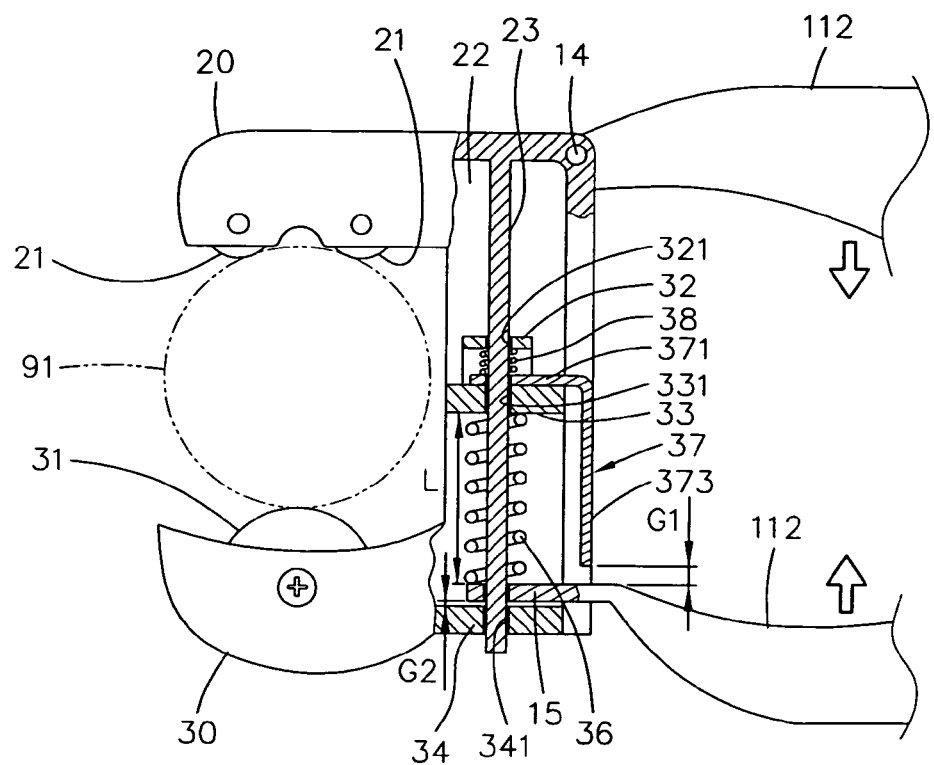
FIG. 9 shows the actual operation in condition 1 of this invention.

(2) Hold the manual input portion 111. It makes movement output portions 112 close quickly. When the manual input portion 111 rotates, the central pivoting portion 12 becomes a rotating center. Thus, the tube cutting base 20 quickly contacts with the tube cutting slider 30 and clamp on the outer surface of the pipe 91. As shown in FIG. 9, at this moment, because there is no large force applying on the manual input portion 111, both the cutting blade 31 and the auxiliary rollers 21 just touch the outer surface of the pipe 91 slightly. Assume that there is a first distance G1 (about two units) between the pushing plate 15 and controlling section 373 of the stopping plate 37. Also, a pushing plate 15 just contacts with the lower blocking portion 34, so the distance between them, also defined as the second distance G2, is zero. And, the spring 36 has a length L (not compressed yet).

Figure 10:
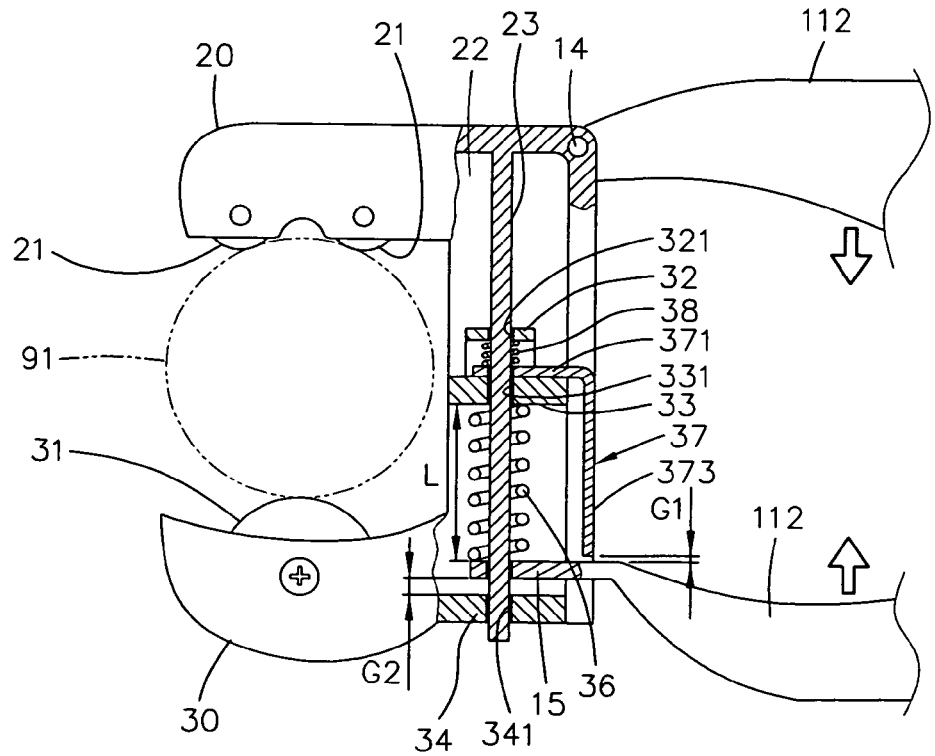
FIG. 10 shows the actual operation in condition 2 of this invention.

(3) Initially apply force on the manual input portion 111. The movement output portion 112 begins to compress the feeding spring 36 via the pushing plate 15 (to make the feeding spring accumulating energy) to certain distance. As shown in FIG. 10, the first distance G1 between the pushing plate 15 and the controlling section 373 of the stopping plate 37 becomes shorter; whereas the second distance G2 between the pushing plate 15 and the lower blocking portion 34 become larger (G2>0). Thus, the feeding spring 36 has been compressed and has stored certain energy.

Figure 11:
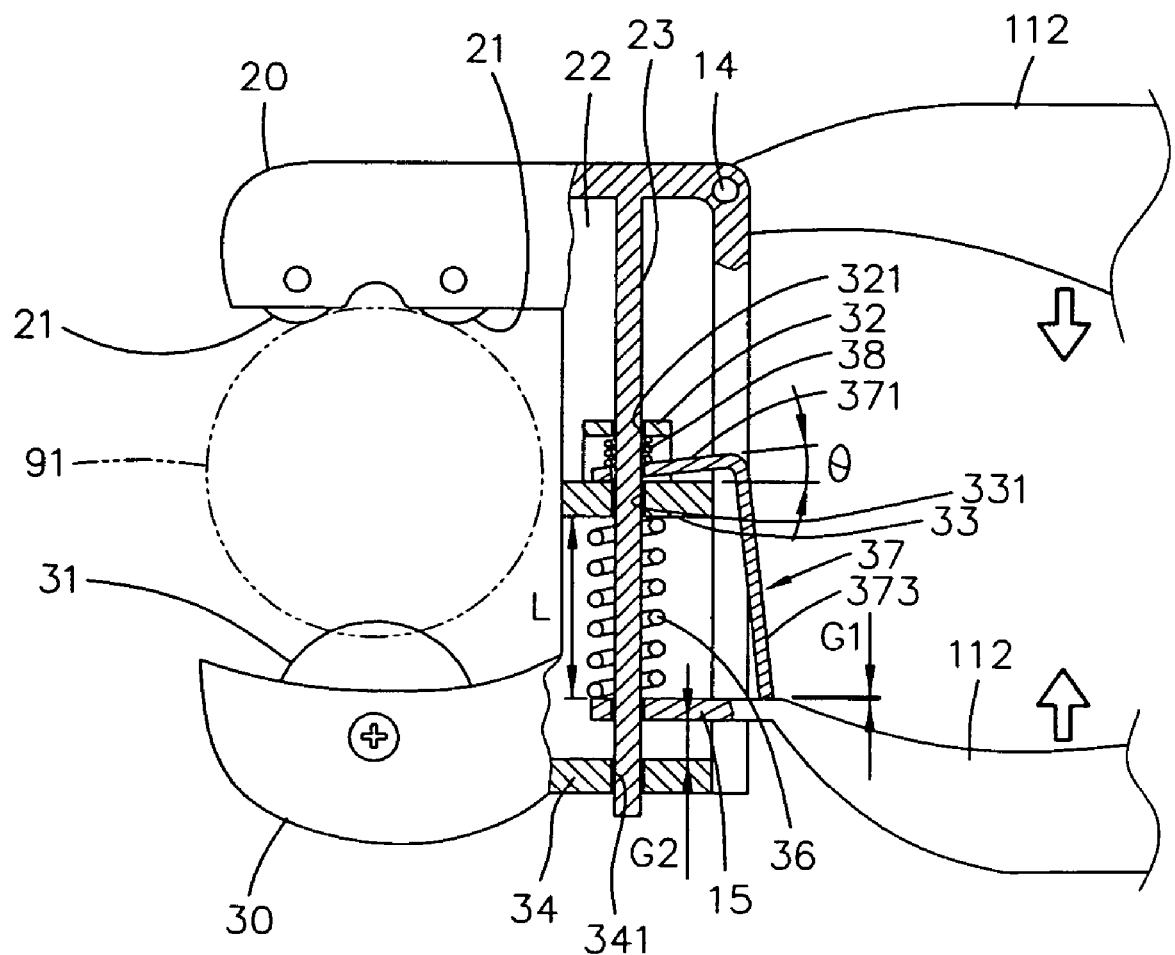
FIG. 11 shows the actual operation in condition 3 of this invention.

(4) Continue to apply force under a safety value. If the applying force is too large over a pre-set safety value, the pushing plate 15 will press against the controlling section 373 of the stopping plate 37. At this time, the controlling section 373 pushes the stopping section 371, and makes the stopping section 371 tilted. Under this condition, the tilted stopping hole 372 will press against the locking rod 23 (also will compress stopping spring 38). Therefore, it forms a locking state, as illustrated in FIG. 11. Meanwhile, it makes the tube cutting base 20 and the tube cutting slider 30 not moving or relatively sliding. Also, it limits the tube cutting slider 30 moving toward the tube cutting base 20. Hence, it can avoid the problem caused by over-feeding on the pipe 91 (to make the pipe 91 deform). Particularly, for a non-professional user, it is an excellent design to prevent over-applying force.

(5) Rotate it to cut the pipe. By rotating the present invention around the pipe 91, it can gradually cut the pipe 91. Because the one-way braking assembly 13 effectively locks the pliers 11, when the hand moves away, the movement output portion 112 will not open. In addition, the compressed spring 36 will release its energy to push on the cutting blade 31. Once the cutting blade 31 moves around the pipe 91, there is always a pushing force against the cutting blade 31 to cut into the pipe 91. It is not necessary to manually feed in every circle around the pipe 91. Therefore, it is possible to cut the pipe 91 by rotating several circles around it. It also achieves the function of automatically cutting.

(6) Further feed the pipe 91 in. If the user wants to speed up the cutting speed, the user can apply more force on the manual input portion 111 by applying greater hand pressure after several rotations. The user can easily compress the feeding spring 36 via the movement output portion 112 and the pushing plate 15. Because the position of the pushing plate 15 is fixed, when the cutting blade 31 moves around the pipe 91 one rotation, the cutting blade 31 will cut into the pipe 91 a small amount by the feeding spring 36. After rotating several, the tube cutting slider 30 will accumulate certain moving distance. This movement makes the middle blocking portion 33 move and push on the stopping section 371. At this moment, the stopping section 371 still is pressed back by the stopping spring 38. It also makes the tilting angle θ of the stopping plate 37 becomes smaller. Hence, it releases the locking condition that the stopping hole 372 of the stopping plate 37 locks with the locking rod 23. Therefore, the user can continue to apply force to achieve the automatic feeding function, until the pipe 91 is cut off eventually.

In addition, the spring 36 or the stopping spring 38 can be replaced by a resilient plate or other resilient force generating element.

The advantages and functions of the present invention can be summarized as follows:

[1] It can quickly clamp on a pipe. By utilizing the pliers 11 of the present invention, it can quickly clamp on the pipe 91 by the cutting blade 31 and the auxiliary rollers 21. They almost suddenly reach the pipes 91, no matter whether the pipe's size is large or small. Thus, it can quickly clamp on a pipe to be cut.

[2] It can avoid over-applying force. In this invention, the movement output portion 112 connects with a pushing plate 15. When the applying force is too large (to compress the feeding spring 36 too much) the pushing plate 15 will press against the stopping plate 37 to make it tilted (the tilting angle θ>0). Then, it is firmly locked. No more applying force can be added. Thus, it can solve the over-applying force problem and prevent the pipe 91 to be deformed or destroyed.

[3] It can automatically feed in and cut it. After quickly clamping on the pipe 91, proper applying force makes the feeding spring 36 compress. Then, by rotating this invention, it can gradually cut the pipe 91. During such cutting process, the feeding spring 36 automatically pushes the cutting blade 31 into the pipe 91, so that it can achieve the purpose of automatic feeding and cutting. There is no need to feed in for every rotation.

[4] It utilizes the design of hand-clamping method for feeding the blade. In the actual pipe cutting process, if the user wants to increase the feeding speed, just hold the manual input portion 111 tighter. Then, the movement output portion 112 will easily force the pushing plate 15 to compress the feeding spring 36. Furthermore, it can cut the pipe 91 by rotational cutting. Thus, this invention has a unique hand-clamping method for feeding the blade.

The above embodiments are only used to illustrate the present invention, not intended to limit the scope thereof. Many modifications of the above embodiments can be made without departing from the spirit of the present invention.

What is claimed is:

1. A tube cutter having a relative movement generating portion comprising:

a relative movement generating portion having a manual input portion, a pair of movement output portions, a one-way braking assembly, a connecting portion and a pushing plate, said manual input portion being provided for hand-holding, one of said pair of movement output portions being connected with said connecting portion and the other one of said pair of movement output portions being connected with said pushing plate, said pair of movement output portions selectively moving the push plate toward the connecting portion;

a tube cutting base, said tube cutting base being disposed with a set of auxiliary rollers, a receiving space and a pair of guiding slots;

a tube cutting slider having a cutting blade corresponding to said auxiliary rollers, a middle blocking portion, a lower blocking portion, a pair of sliding guiders, and a spring;

wherein said middle blocking portion has a middle hole, said lower blocking portion has a lower hole, one end of said spring presses on said middle blocking portion and the other end of said spring presses on said pushing plate, wherein said manual input portion and said pair of movement output portions of said relative movement generating portion are disposed on two ends of a pair of pliers, said pair of pliers is pivoted by a central pivoting portion, a resilient element is disposed on said central pivoting portion for opening said manual input portion when an one-way braking condition is removed, an one-way braking assembly is disposed with a releasing element for removing said one-way braking condition.

2. A tube cutter having a relative movement generating portion comprising:

a relative movement generating portion having a manual input portion, a pair of movement output portions, a one-way braking assembly, a connecting portion and a pushing plate, said manual input portion being provided for hand-holding, one of said pair of movement output portions being connected with said connecting portion and the other one of said pair of movement output portions being connected with said pushing plate, said pair of movement output portions selectively moving the push plate toward the connecting portion;

a tube cutting base, said tube cutting base being disposed with a set of auxiliary rollers, a receiving space and a pair of guiding slots;

a tube cutting slider having a cutting blade corresponding to said auxiliary rollers, a middle blocking portion, a lower blocking portion, a pair of sliding guiders, and a spring;

wherein said middle blocking portion has a middle hole, said lower blocking portion has a lower hole, one end of said spring presses on said middle blocking portion and the other end of said spring presses on said pushing plate, wherein:

said tube cutting base further includes a locking rod;

said tube cutting slider further includes:

an upper blocking portion having an upper hole;

a stopping plate having a stopping section, a stopping hole disposed on said stopping section, and a controlling section extending toward said pushing plate, said stopping section being adjacent to said middle blocking portion; and a stopping spring, one end of said stopping spring pressing against said upper blocking portion and the other end of said stopping spring pressing on said stopping section.

* * * * *